(12) United States Patent
Yang

(10) Patent No.: US 11,122,931 B2
(45) Date of Patent: Sep. 21, 2021

(54) MODE SWITCHING DEVICE AND A GRILL MACHINE INCLUDING THE SAME

(71) Applicant: Tsann Kuen (Zhangzhou) Enterprise Co., Ltd., Fujian (CN)

(72) Inventor: Yuan Yang, Fujian (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 379 days.

(21) Appl. No.: 16/210,065

(22) Filed: Dec. 5, 2018

(65) Prior Publication Data

US 2019/0183287 A1   Jun. 20, 2019

(30) Foreign Application Priority Data

Dec. 15, 2017  (CN) .......................... 201721753395.8

(51) Int. Cl.
  *A47J 37/06*  (2006.01)
(52) U.S. Cl.
  CPC ....... *A47J 37/0611* (2013.01); *A47J 37/0676* (2013.01)
(58) Field of Classification Search
  CPC .. A47J 37/0611; A47J 37/0676; A47J 37/067; A47J 43/0777; A47J 2037/0617; A47J 99/372; A47J 99/379; A47J 99/378; H01H 11/04; H01H 11/0012; A61M 2016/0024; B66C 7/16; E01B 7/20
  See application file for complete search history.

(56) References Cited

U.S. PATENT DOCUMENTS

| 1,887,966 | A | * | 11/1932 | Strite | A47J 37/0611 74/3.54 |
|---|---|---|---|---|---|
| 2,213,728 | A | * | 9/1940 | Allenby | A47J 37/0611 99/331 |
| 4,985,605 | A | * | 1/1991 | Valenzona | H01H 13/585 200/275 |
| 6,782,804 | B1 | * | 8/2004 | Lin | A47J 37/0611 99/349 |
| 2003/0205635 | A1 | * | 11/2003 | Lazzer | B26D 7/24 241/37.5 |
| 2012/0152126 | A1 | * | 6/2012 | Robinson | A47J 37/0611 99/331 |
| 2012/0312175 | A1 | * | 12/2012 | Xu | A47J 37/0611 99/339 |

(Continued)

FOREIGN PATENT DOCUMENTS

FR   2765467 A1 * 1/1999 ............ A47J 43/046

*Primary Examiner* — Dana Ross
*Assistant Examiner* — Adam Michael Eckardt
(74) *Attorney, Agent, or Firm* — Burris Law, PLLC

(57) ABSTRACT

A grill machine includes a grill mechanism, a temperature control device and a mode switching device. The grill mechanism includes a lower grill unit, and an upper grill unit that is pivotally connected to the lower grill unit and that is pivotable between an open position and a closed position. The temperature control device is switchable between a first heating mode and a second heating mode. The mode switching device includes an actuating unit that is mounted to the lower grill unit. When the upper grill unit is pivoted to the open position, the upper grill unit downwardly presses the actuating unit to switch the temperature control device from the first heating mode to the second heating mode.

8 Claims, 5 Drawing Sheets

(56) References Cited

U.S. PATENT DOCUMENTS

| | | | |
|---|---|---|---|
| 2015/0144007 A1* | 5/2015 | Li | A47J 37/0611 99/372 |
| 2015/0230659 A1* | 8/2015 | Hoare | A47J 37/0611 99/375 |
| 2015/0320258 A1* | 11/2015 | Huang | A47J 36/32 99/331 |
| 2016/0198898 A1* | 7/2016 | Steeb | A47J 37/0611 426/549 |
| 2016/0360923 A1* | 12/2016 | Buzick | A47J 37/0611 |
| 2017/0181575 A1* | 6/2017 | Asfaw | A47J 27/004 |
| 2017/0196399 A1* | 7/2017 | Ayre | A47J 33/00 |
| 2017/0208994 A1* | 7/2017 | Sharon | A47J 37/0611 |

* cited by examiner

MODE SWITCHING DEVICE AND A GRILL MACHINE INCLUDING THE SAME

CROSS-REFERENCE TO RELATED APPLICATION

This application claims priority of Chinese Utility Model Patent Application No. 201721753395.8, filed on Dec. 15, 2017.

FIELD

The disclosure relates to a food processing device, and more particularly to a mode switching device and a grill machine including the same.

BACKGROUND

A conventional grill machine includes a grill mechanism, and a temperature control device mounted to the grill mechanism. The grill mechanism includes a lower grill unit and an upper grill unit that are pivotally connected to each other. The upper grill unit is pivotable between an open position and a closed position relative to the lower grill unit. The temperature control device is operable to adjust the grilling temperature of the upper and lower grill units.

In some cases, in order to improve the functionality of the grill machine, a mode switching device is mounted to the lower grill unit. In such a manner, the mode switching device can be pushed horizontally to actuate the temperature control device as the upper grill unit is pivoted to the open position, such that the temperature control device may switch between different heating modes. The structural design of such conventional grill machines is to use the pivoting of a handle mounted on the upper grill unit to bring the upper grill unit to the open position, and simultaneously push the mode switching device to move horizontally. However, such conventional grill machines may malfunction due to the following reasons. First, the handle may fail to touch the mode switching device due to structural errors in the assembly, such that the temperature control device cannot switch between different heating modes. Second, the distance between the handle and the mode switching device may be too short such that when the handle is pivoted, a pushing member of the mode switching device is pushed forcibly into the lower grill unit, thereby causing an elastic member that is compressed by the pushing member to become stuck in the lower grill unit and fail to rebound.

SUMMARY

Therefore, the object of the disclosure is to provide a mode switching device and a grill machine including the same that can alleviate at least one of the drawbacks of the prior art.

According to a first aspect of the disclosure, a grill machine includes a grill mechanism, a temperature control device and a mode switching device. The grill mechanism includes a lower grill unit, and an upper grill unit that is pivotally connected to the lower grill unit and that is pivotable between an open position and a closed position. The temperature control device is switchable between a first heating mode and a second heating mode. The mode switching device includes an actuating unit that is mounted to the lower grill unit. When the upper grill unit is pivoted from the closed position to the open position, the upper grill unit downwardly presses the actuating unit to switch the temperature control device from the first heating mode to the second heating mode.

According to a second aspect of the disclosure, a mode switching device is adapted to be mounted to a grill machine. The grill machine includes a lower grill unit, an upper grill unit and a temperature control device. The upper grill unit is pivotally connected to the lower grill unit and is pivotable between an open position and a closed position. The temperature control device is switchable between a first heating mode and a second heating mode. The mode switching device includes an actuating unit that is adapted to be mounted to the lower grill unit. When the upper grill unit is pivoted from the closed position to the open position, the upper grill unit downwardly presses the actuating unit to switch the temperature control device from the first heating mode to the second heating mode.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
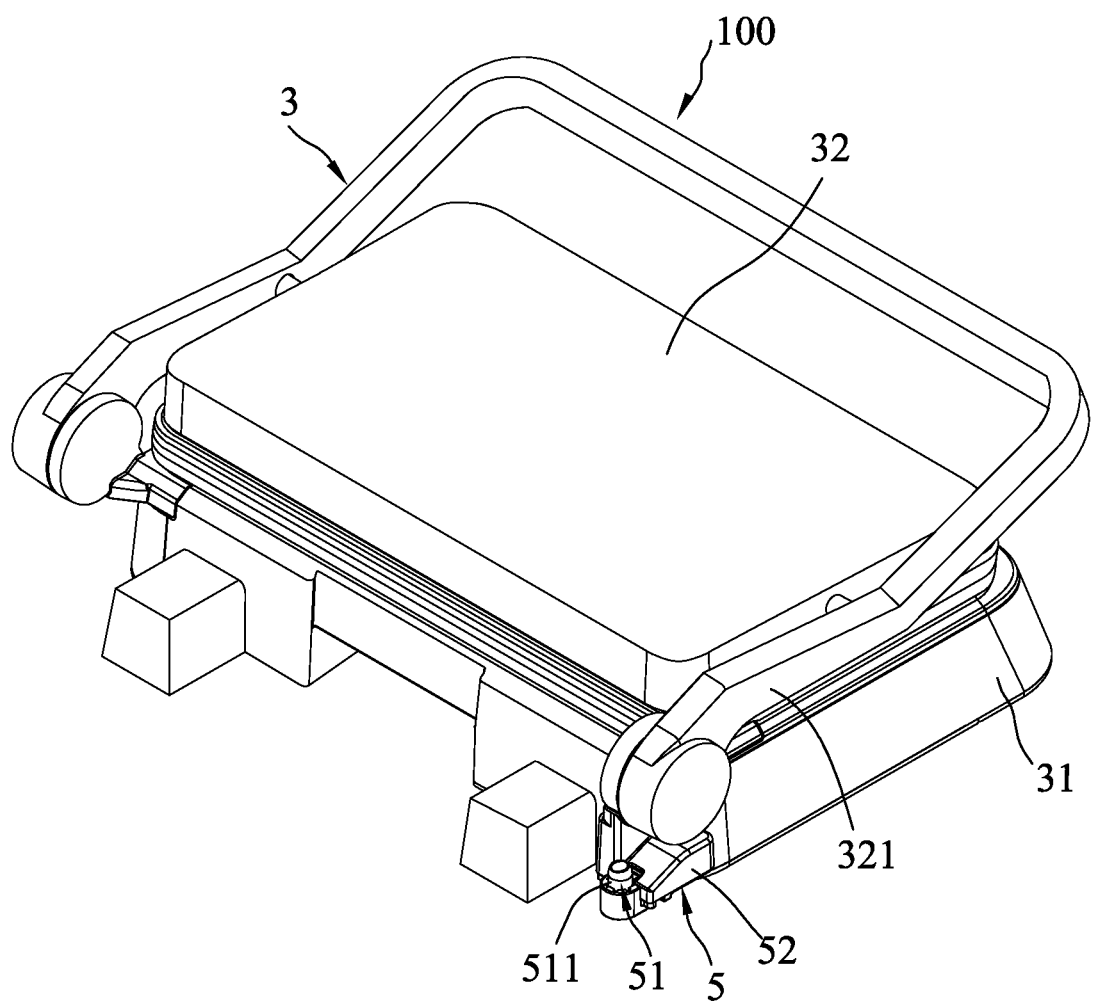
FIG. 1 is a perspective view of an embodiment of the grill machine according to the disclosure.
Figure 2:
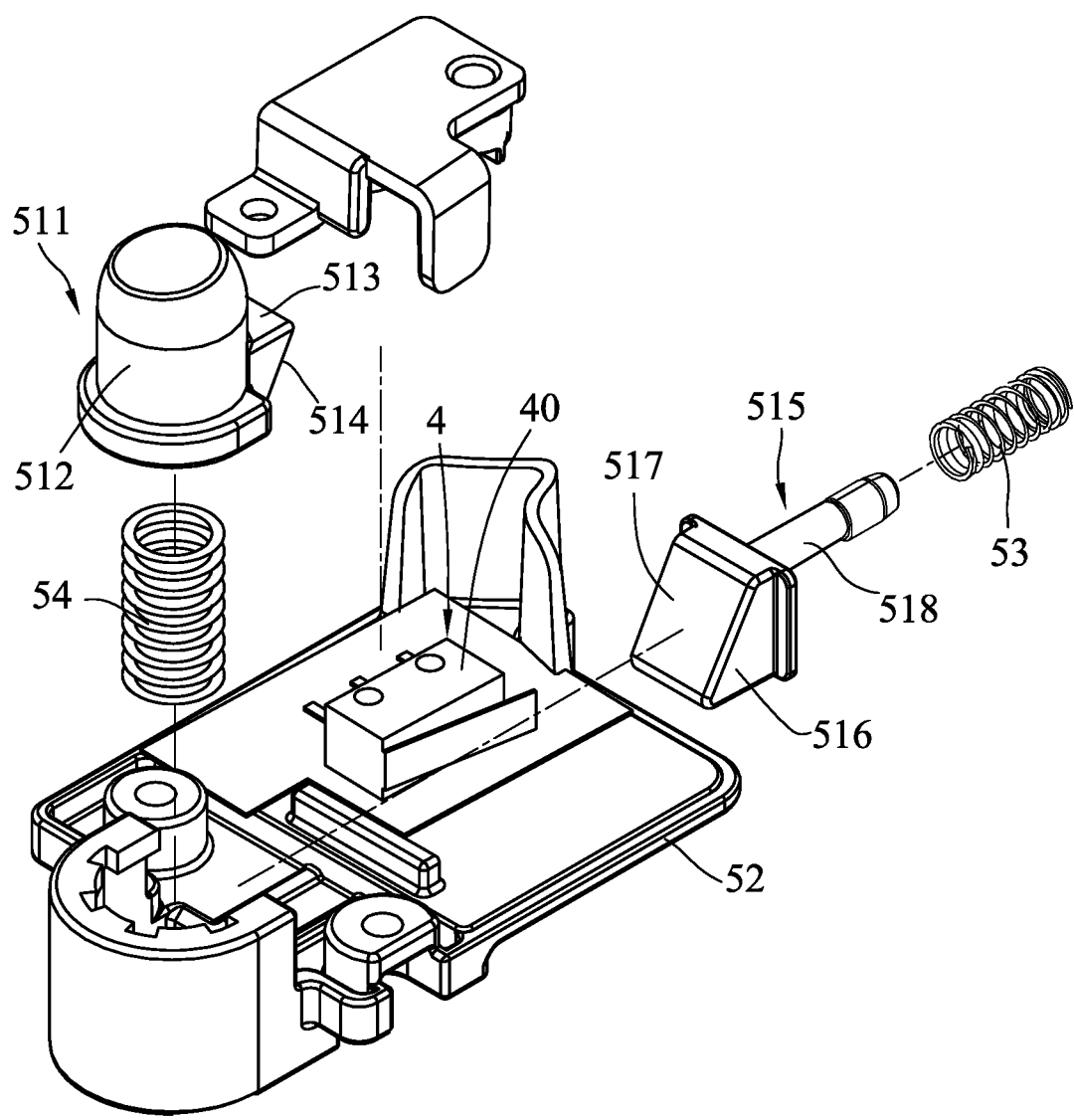
FIG. 2 is a partly exploded perspective view of a mode switching device of the embodiment.

Referring to FIGS. 1 and 2, an embodiment of the grill machine 100 according to the disclosure includes a grill mechanism 3, a temperature control device 4 that is mounted to the grill mechanism 3, and a mode switching device 5.

The grill mechanism 3 includes a lower grill unit 31, and an upper grill unit 32 that is pivotally connected to the lower grill unit 31 and that is pivotable between an open position and a closed position. The upper grill unit 32 includes a handle 321 that is pivotally connected to the lower grill unit 31, and that is pivotable by a user.

Figure 4:
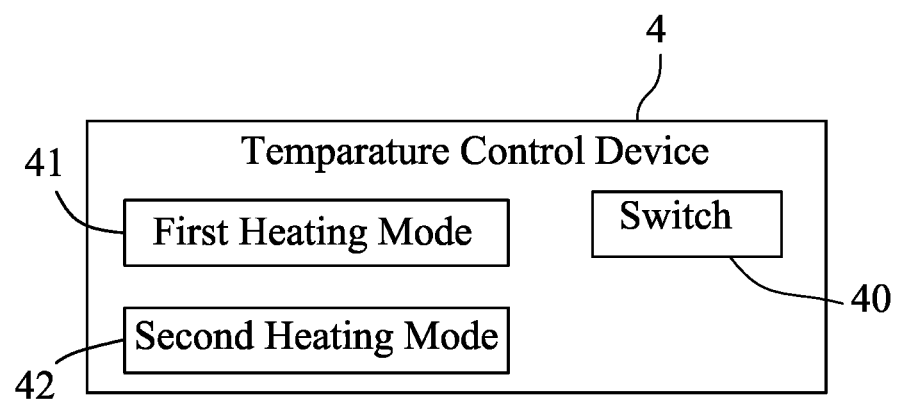
FIG. 4 is a block diagram of the embodiment illustrating the functionality of a temperature control device.

Referring to FIGS. 1, 2 and 4, the temperature control device 4 is for controlling the temperature of the upper and lower grill units 32, 31. The temperature control unit 4 includes a switch 40 and is switchable between a first heating mode 41 and a second heating mode 42 that have different heating functions. Since there are various kinds of approach for the temperature control unit 4 to control the temperatures of the upper and lower grill units 32, 31, the details thereof are not mentioned hereinafter.

The mode switching device 5 is adapted to actuate the switch 40 of the temperature control unit 4 to switch between the first heating mode 41 and the second heating mode 42. Referring FIGS. 1, 2 and 3, the mode switching device 5 is mounted to a rear end of the lower grill unit 31, and includes an actuating unit 51, a mounting seat 52, a longitudinal biasing member 54 and a transverse biasing member 53. The mounting seat 52 is mounted to the lower grill unit 31. The actuating unit 51 is mounted to the mounting seat 52 and is downwardly pressable by the handle 321 when the upper grill unit 32 is at the open position (i.e., the upper grill unit 32 downwardly presses the actuating unit 51). The switch 40 is mounted to the mounting seat 52.

The actuating unit 51 includes a first pushing member 511 and a second pushing member 515 that that are mounted movably to the mounting seat 52.

The first pushing member 511 has a protruding portion 512, and an upper pushing portion 513 that extends from a side of the protruding portion 512 and that has an upper inclined surface 514. The second pushing member 515 has a lower pushing portion 516 that has a lower inclined surface 517, and an abutting rod 518 that extends from the lower pushing portion 516 toward the switch 40. The upper inclined surface 514 of the upper pushing portion 513 is to contact the lower inclined surface 517 of the lower pushing portion 516. The abutting rod 518 extends horizontally from the lower pushing portion 516, is adapted to be spaced apart from the temperature control device 4 due to the biasing action of the transverse biasing member 53 when the upper grill unit 32 is at the closed position, and is adapted to be moved to contact and to switch the temperature control device 4 from the first heating mode 41 to the second heating mode 42 when the upper grill unit 32 is pivoted from the closed position to the open position.

When the handle 321 is pressed down, the protruding portion 512 of the first pushing member 511 is pushed by the handle 321 of the upper grill unit 32 to move downwardly, such that the upper pushing portion 513 is co-moved with the protruding portion 512. Then, the upper inclined surface 514 of the upper pushing portion 513 abuts against and pushes the lower inclined surface 517 of the lower pushing portion 516 to horizontally move the second pushing member 515. In such a manner, the abutting rod 518 is co-moved with the second pushing member 515 to contact and to switch the temperature control device 4 from the first heating mode 41 (as shown in FIG. 4) to the second heating mode 42 (as shown in FIG. 4).

The transverse biasing member 53 is disposed horizontally between the mounting seat 52 and the lower pushing portion 516 of the second pushing member 515, is sleeved on the abutting rod 518, and constantly abuts against the mounting seat 52 and the lower pushing portion 516 to bias the second pushing member 515 horizontally away from the switch 40. The longitudinal biasing member 54 is disposed vertically between the mounting seat 52 and the protruding portion 512 of the first pushing member 511, and constantly abuts against the mounting seat 52 and the protruding portion 512 of the first pushing member 511 to bias the first pushing member 511 upwardly.

Figure 3:
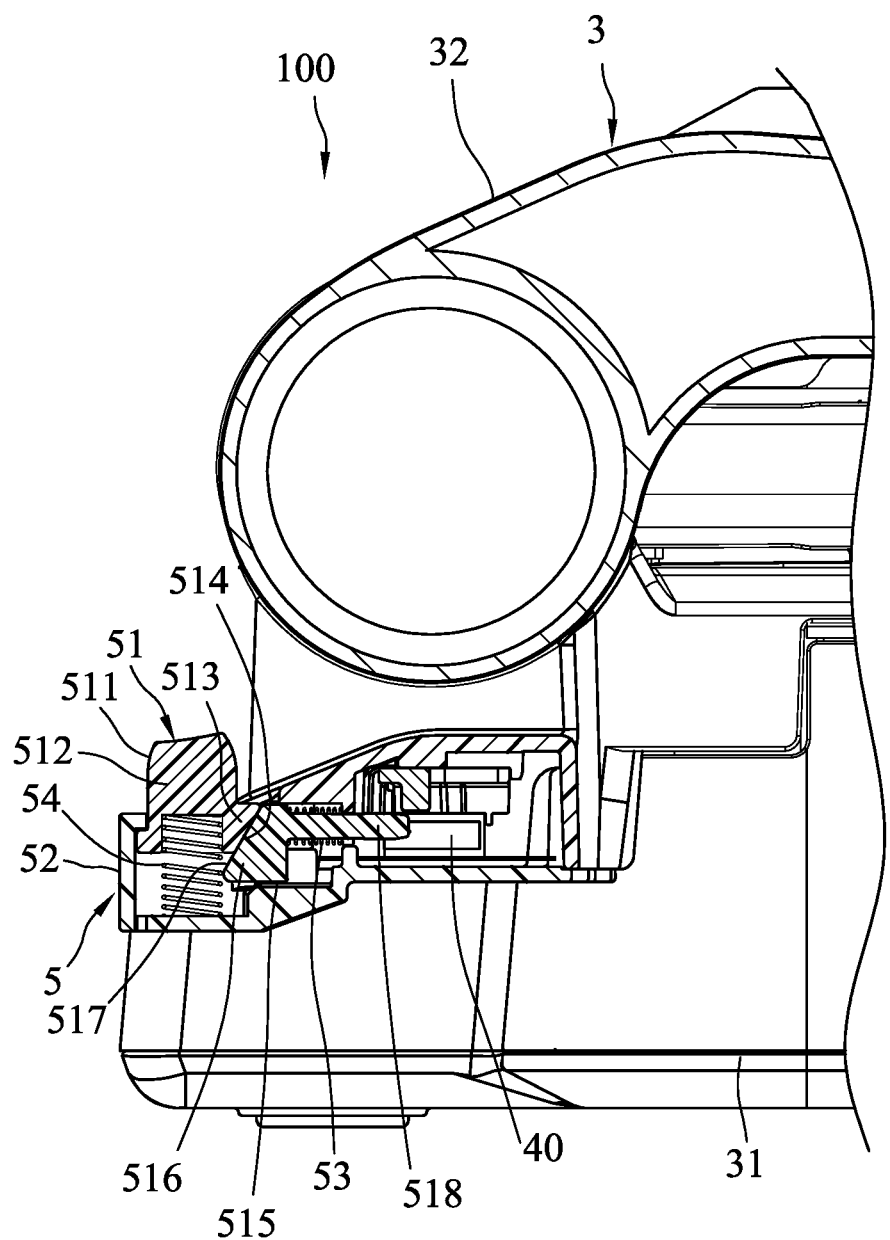
FIG. 3 is a fragmentary sectional view of the embodiment, illustrating a state where an upper grill unit is at a closed position.
Figure 5:
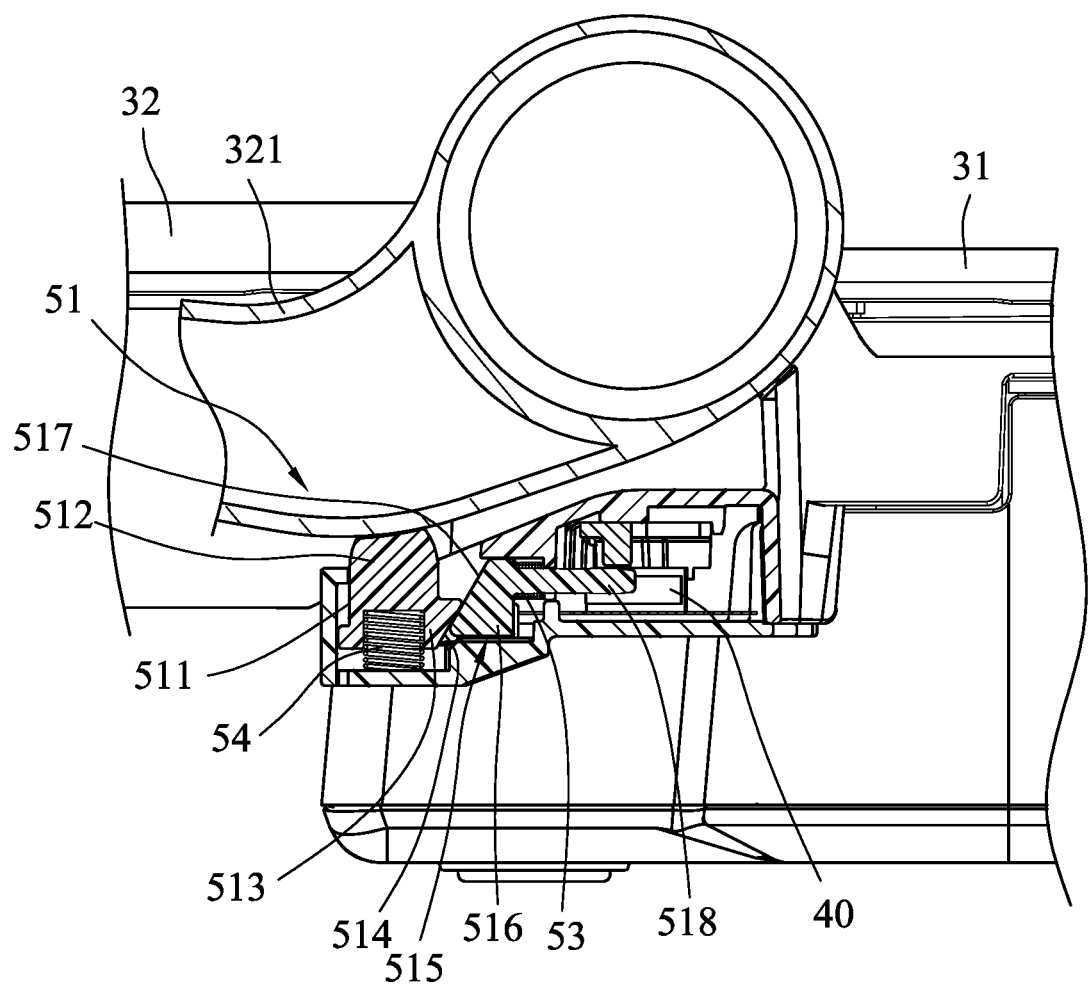
FIG. 5 is another fragmentary sectional view of the embodiment, illustrating a state where the upper grill unit is at an open position and is abutting downwardly the mode switching device.

Referring to FIGS. 1, 2 and 3, when the grill machine 100 is in use and when the upper grill unit 32 is right above the lower grill unit 31 at the closed position, the switch 40 of the temperature control device 4 is not actuated by the abutting rod 518 of the second pushing member 515. At this time, the temperature control device 4 is in the first heating mode 41 (as shown in FIG. 4) and controls the temperatures of the upper and lower grill units 32, 31 via the first heating mode 41. When the upper grill unit 32 is pivoted to the open position (see FIG. 5), the handle 321 is moved downwardly to push the first pushing member 511 downwardly, such that the second pushing member 515 is pushed horizontally to actuate the switch 40. Thus, the temperature control device 4 is switched from the first heating mode 41 to the second heating mode 42 (as shown in FIG. 4).

During the downward movement of the first pushing member 511, the longitudinal biasing member 54 is compressed to accumulate elastic potential energy, and during the lateral movement of the second pushing member 515, the transverse biasing member 53 is compressed to accumulate elastic potential energy. When the upper grill unit 32 is pivoted from the open position to the closed position, the handle 321 is moved to be apart from the first pushing member 511 and does not push down the first pushing member 511. At this time, the elastic potential energy of the longitudinal biasing member 54 initiates a biasing action to push the first pushing member 511 upwardly. In the meantime, the elastic potential energy of the transverse biasing member 53 initiates a biasing action to push the second pushing member 515 to be spaced apart from the temperature control device 4, such that the temperature control device 4 is switched from the second heating mode 42 to the first heating mode 41. In other words, the switch 40 is not actuated by the abutting rod 518 of the actuating unit 51.

In the present embodiment, the first pushing member 511 pushes the second pushing member 515 when the upper inclined surface 514 abuts against the lower inclined surface 517. However, in other embodiments of the disclosure, as long as the first pushing member 511 can abut against and push the lower inclined surface 517 such that the second pushing member 515 simultaneously moves horizontally as the first pushing member 511 moves vertically, it is not necessarily for the first pushing member 511 to have the upper inclined surface 514.

In addition, in other embodiments of the disclosure, the longitudinal biasing member 54 is omissible as long as the transverse biasing member 53 is able to push the second pushing member 515 to further push the first pushing member 511 upward.

Moreover, it should be noted that, in the present embodiment, the mode switching device 5 and the switch 40 are mounted to the lower grill unit 31, and are actuated when the upper grill unit 32 is pivoted to the open position. However, in other embodiments of the disclosure, the mode switching device 5 and the switch 40 are mounted to the upper grill unit 32 and can still be actuated by the lower grill unit 31 when the upper grill unit 32 is pivoted to the open position.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A mode switching device adapted to be mounted to a grill machine, the grill machine including a lower grill unit, an upper grill unit and a temperature control device, the upper grill unit being pivotally connected to the lower grill unit and being pivotable between an open position and a closed position, the temperature control device being switchable between a first heating mode and a second heating mode, said mode switching device comprising an actuating unit that is adapted to be mounted to the lower grill unit,
wherein, when the upper grill unit is pivoted from the closed position to the open position, the upper grill unit downwardly presses said actuating unit;
wherein said actuating unit includes a first pushing member and a second pushing member;
wherein when the upper grill unit is pivoted from the closed position to the open position, the upper grill unit downwardly presses said first pushing member such that said first pushing member moves vertically to push the second pushing member to move horizontally so as to switch the temperature control device from the first heating mode to the second heating mode;
wherein said second pushing member has a lower pushing portion that has a lower inclined surface;
wherein said first pushing member has a protruding portion that is adapted to be pushed by the upper grill unit, and an upper pushing portion that abuts against said lower inclined surface so that said upper pushing portion is co-moved with said protruding portion to push said lower inclined surface to horizontally move said second pushing member when said protruding portion is pushed by the upper grill unit to move downwardly;
wherein said upper pushing portion has an upper inclined surface that contacts said lower inclined surface of said second pushing member such that said upper inclined surface moves along said lower inclined surface and pushes said lower inclined surface to move said second pushing member when said protruding portion is pushed by the upper grill unit to move downwardly; and
wherein said protruding portion has a top surface that is adapted for the upper grill unit to abut thereagainst when the upper grill unit is pivoted from the closed position to the open position, and that is substantially perpendicular to a direction of the downward movement of the upper grill unit pressing the first pushing member.

2. The mode switching device as claimed in claim 1, wherein:
said mode switching device further comprises a mounting seat to which said actuating unit is mounted and which is adapted to be mounted to the lower grill unit, and a transverse biasing member that is connected between said mounting seat and said second pushing member; and
when the upper grill unit is at the closed position so that said first pushing member is not pushed by the upper grill unit, said transverse biasing member biases said second pushing member to move horizontally away from the temperature control device such that said second pushing member pushes said first pushing member to move upwardly.

3. The mode switching device as claimed in claim 2, wherein said mode switching device further comprises a longitudinal biasing member that is connected between said mounting seat and said first pushing member, and that biases said first pushing member to move upwardly.

4. The mode switching device as claimed in claim 3, wherein:
said second pushing member further has an abutting rod that extends horizontally from said lower pushing portion, that is adapted to be spaced apart from the temperature control device due to the biasing action of said transverse biasing member when the upper grill unit is at the closed position, and that is adapted to be moved to contact and switch the temperature control device from the first heating mode to the second heating mode when the upper grill unit is pivoted from the closed position to the open position.

5. A grill machine comprising:
a grill mechanism including
a lower grill unit, and
an upper grill unit that is pivotally connected to said lower grill unit and that is pivotable between an open position and a closed position;
a temperature control device switchable between a first heating mode and a second heating mode; and
a mode switching device including an actuating unit that is mounted to said lower grill unit,
wherein, when said upper grill unit is pivoted from the closed position to the open position, said upper grill unit downwardly presses said actuating unit;
wherein said actuating unit includes a first pushing member and a second pushing member;
wherein when said upper grill unit is pivoted from the closed position to the open position, said upper grill unit downwardly presses said first pushing member such that said first pushing member moves vertically to push said second pushing member to move horizontally so as to switch said temperature control device from the first heating mode to the second heating mode;
wherein said second pushing member has a lower pushing portion that has a lower inclined surface;
wherein said first pushing member has a protruding portion, and an upper pushing portion that abuts against said lower inclined surface so that said upper pushing portion is co-moved with said protruding portion to push said lower inclined surface to horizontally move said second pushing member when said protruding portion is pushed by said upper grill unit to move downwardly;
wherein said upper pushing portion has an upper inclined surface that contacts said lower inclined surface of said second pushing member such that said upper inclined surface moves along said lower inclined surface and pushes said lower inclined surface to move said second pushing member when said protruding portion is pushed by said upper grill unit to move downwardly; and
wherein said protruding portion has a top surface that is configured for said upper grill unit to abut thereagainst when said upper grill unit is pivoted from the closed position to the open position, and that is substantially perpendicular to a direction of the downward movement of said upper grill unit pressing the first pushing member.

6. The grill machine as claimed in claim 5, wherein:
said mode switching device further includes a mounting seat to which said actuating unit is mounted and which is mounted to said lower grill unit, and a transverse biasing member that is connected between said mounting seat and said second pushing member; and when said upper grill unit is at the closed position so that said first pushing member is not pushed by said upper grill unit, said transverse biasing member biases said second pushing member to move horizontally away from said temperature control device such that said second pushing member pushes said first pushing member to move upwardly.

7. The grill machine as claimed in claim 6, wherein said mode switching device further includes a longitudinal biasing member that is connected between said mounting seat and said first pushing member, and that biases said first pushing member to move upwardly.

8. The grill machine as claimed in claim 7, wherein:

said second pushing member further has an abutting rod that extends horizontally from said lower pushing portion, that is adapted to be spaced apart from said temperature control device due to the biasing action of said transverse biasing member when said upper grill unit is at the closed position, and that is moved to contact and switch the temperature control device from the first heating mode to the second heating mode when said upper grill unit is pivoted from the closed position to the open position.

* * * * *